Oct. 19, 1965  R. MURFITT ETAL  3,212,657
BULK TRANSPORTING VEHICLES
Filed Nov. 6, 1963  7 Sheets-Sheet 7

Fig.12.

Inventors:
Ralph Murfitt
and
Ellis Glyn Parry
By: Baldwin & Hight
attorneys

United States Patent Office 3,212,657
Patented Oct. 19, 1965

3,212,657
BULK TRANSPORTING VEHICLES
Ralph Murfitt, Wisbech, and Ellis Glyn Parry, Newark, England, assignors to Murfitt Bulk Transporters Limited, Wisbech, England, and Associated British Maltsters Limited, Newark, England, both corporations of the United Kingdom
Filed Nov. 6, 1963, Ser. No. 321,763
Claims priority, application Great Britain, Nov. 9, 1962, 42,446/62
20 Claims. (Cl. 214—82)

This invention relates to means for discharging and/or loading containers for the storage or transport of goods or materials. The invention will hereinafter be described in relation to vehicles with which the invention is particularly useful, but it is to be understood that it is equally applicable to static containers. The term vehicle is to be understood to include not only road vehicles whether self-propelled or not, but also rail wagons, ships, barges and aircraft.

While the invention is especially applicable to the discharge of containers for granular pulverulent or other particulate materials in bulk, it can also be employed for loading or discharging packed materials or goods such as sacks, cartons, tins or the like.

According to the invention a container for the storage or transport of materials or goods, having a substantially horizontal floor is provided with a bulkhead traversable in either direction along the said floor, by a plurality of driving wheels on the bulkhead driven by means carried thereon, so that in use the contents of the container can be expelled therefrom by the bulkhead.

The driving wheels may comprise either, pinions, sprockets or pulleys arranged to mesh or cooperate with elongated elements, e.g. racks, chains, ropes or cables respectively secured to the container and extending parallel to the floor.

Preferably the drive means include an hydraulic motor arranged to drive shafts on which the driving wheels are mounted through the intermediary of one or more reduction gearboxes and flexible coupling members.

The pipes or conduits supplying fluid to the hydraulic motor are preferably arranged to be paid out and taken in by a coiling mechanism as the bulkhead moves.

The chains, racks, cables or ropes are preferably provided with a cover to prevent their damaging the contents of the container or the contents clogging them.

In order to ensure that the bulkhead is maintained in proper alignment within the container, it is preferably provided with adjustable guides arranged to abut the inner surfaces of the container. These guides may for example take the form of two pairs of wheels, one pair mounted one on each side of the bulkhead, and the other pair mounted on the bottom thereof.

Preferably also a sealing strip is provided around the periphery of the bulkhead.

In order to render the bulkhead capable of loading as well as discharging the container it may be adapted to have a pallet or the like secured thereto. Then loads placed on the pallet may be drawn into the container by the bulkhead. Equally of course depending upon the nature of the load, ropes or cables could simply be secured to it and to the bulkhead.

In order to increase the versatility of the container in accordance with one embodiment of the invention a secondary bulkhead is provided to divide the container into two compartments, which may then be separately loaded and unloaded. The second bulkhead need not be self driven but may be connected to the first or main bulkhead by guide rods, arranged either to tie the two bulkheads together so that the second bulkhead moves with the first, or when movement of the second bulkhead has been completed, to allow the first bulkhead to move along the guide rods to close on the second bulkhead.

The invention is illustrated in the accompanying drawings as applied to road transport vehicles, in which.

Figure 1:
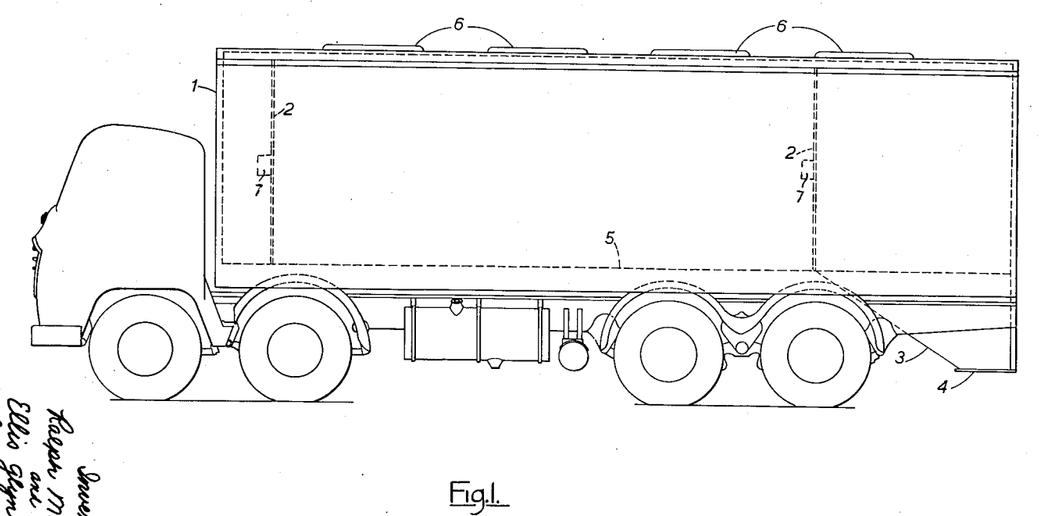
FIGURE 1 is a side elevation of a bulk transporting vehicle provided with a movable bulkhead in accordance with one embodiment of this invention.
Figure 2:
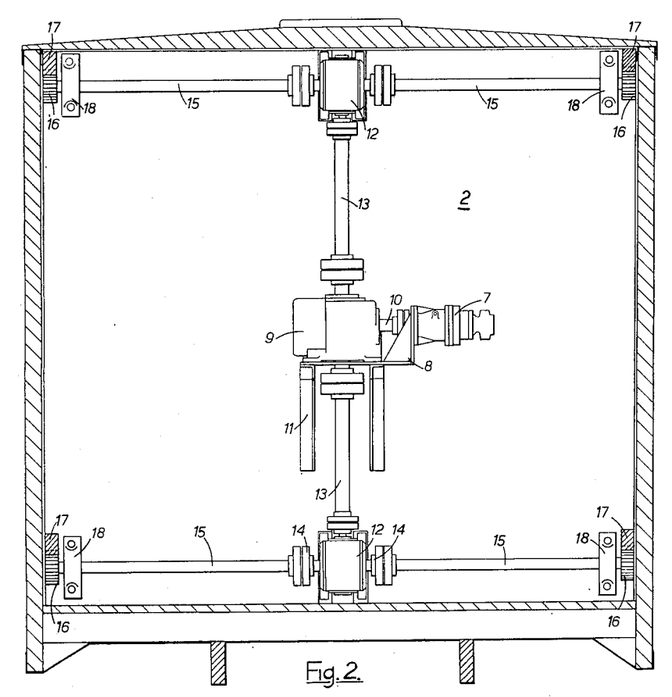
FIGURE 2 is a transverse sectional view of the vehicle showing the front surface of the bulkhead.
Figure 3:
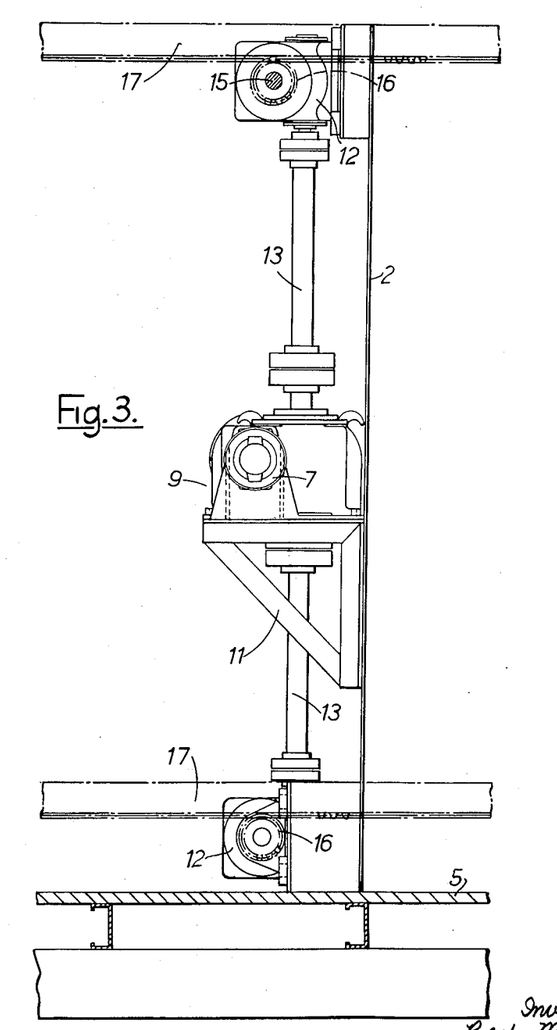
FIGURE 3 is a part longitudinal section through the body of the vehicle and bulkhead.

Referring to FIGURES 1–3, a bulk transporting vehicle having a body 1 is provided with a movable bulkhead assembly comprising a wall 2 arranged to be traversed within the body from a position shown in FIGURE 1 in dotted lines at the front end of the vehicle to the position shown in dotted lines at the rear end of the vehicle.

Loading of the vehicle, the bulkhead being in its forward position, is through hatches 6, and discharge is at the rear down a chute 3 terminating in a discharge opening 4, below the floor of the vehicle which is indicated at 5.

To discharge the vehicle, on arrival at its destination, the discharge opening is opened, when material immediately above the discharge opening can fall under the influence of gravity through the opening to, for example, an underground storage hopper or into a material conveying system, as desired. Once the material immediately above the discharge opening has been discharged, the means driving the movable bulkhead are set in motion, so that it is traversed rearwardly, thereby pushing the remainder of the load towards the discharge opening. If desired, a window, not shown, may be provided in the side of the body to give an indication to the operator of the progress of unloading.

The means for traversing the buckhead wall 2 is, in part, assembled with the wall 2, and comprises an hydraulic motor 7 mounted on a bracket 8 fast with the bulkhead and arranged to drive a primary reduction gearbox 9 through a coupling 10, the reduction gearbox being mounted on a bracket 11 also fast with the bulkhead. The primary reduction gearbox is arranged to drive two secondary reduction gearboxes 12 through coupling shafts 13, the secondary reduction gear boxes which are fast with the bulkhead drive through couplings 14, upper and lower pairs of shafts 15 supported by bearings 18 and on the outer ends of which pinion wheels 16 are keyed. Co-operating with the pinions 16 are upper and lower elongated rack elements 17 which extend lengthwise of the body, so that on rotation of pinions 16, the bulkhead can be shifted bodily in one direction or the other. The racks are preferably housed in channels in the bodywork or may be partly encased in built up channels, to prevent damage to the contents of the body or clogging of the racks. To release any undue stress on the gearboxes, all the couplings are of the flexible type.

The hydraulic motor 7 receives pressure fluid from an hydraulic pump unit, itself driven for example from a power take-off from the gearbox of the vehicle. The hydraulic pipelines (not shown) from the pump to the motor are of a sufficient length to permit the required traverse of the movable bulkhead, the pipelines being paid out or taken in by a coiling mechanism (not shown).

The controls for the hydraulic pump and motor which are conveniently situated in the driver's cab, enable the bulkheads to be traversed in both directions and stopped. Preferably, however, in order to arrest the bulkhead at the limit of its traverse in either direction, a pressure relief valve (not shown) is provided for automatically stopping the motor 7. A visual or audible indication means may be associated with the pressure relief valve to give an indication when this position has been reached.

The bulkhead itself consists of a framework having a single or double skin. Normally it will only be found to be necessary to provide a skin on the operative face of the bulkhead, that is to say the face which bears against the contents of the vehicle body. As the thrust inertia of the bulkhead may tend to deform the side walls of the body, sealing strips 51 (see FIGURES 8 and 9) are fitted to its edges to ensure a complete seal.

In large size transporter vehicles, occasions may arise when the load to be transported is not a capacity one or is made up of two different grades or materials. This difficulty can be met by subdividing the body into two compartments, each having a movable bulkhead.

Figures 8, 9, 11:
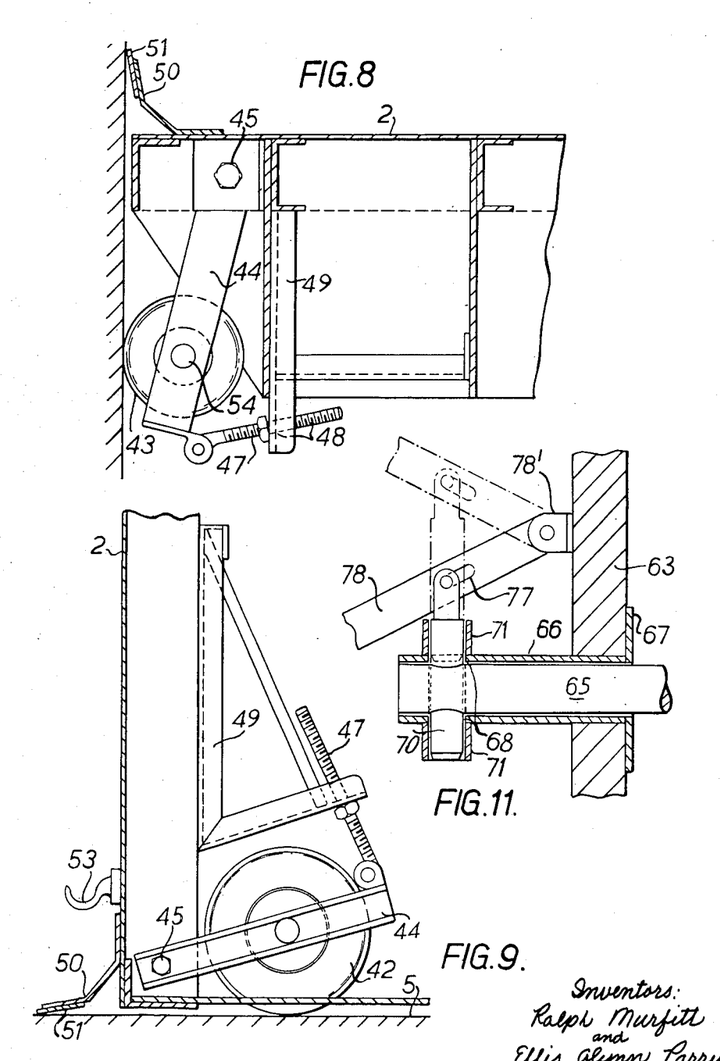
FIGURES 8 and 9 are detail views in plan and elevation respetcively showing wheels by which the bulkhead is aligned and guided within the body of the vehicle.
FIGURE 11 is a detail section of a bulkhead and associated means for connecting the bulkhead to a secondary bulkhead.
Figure 10:
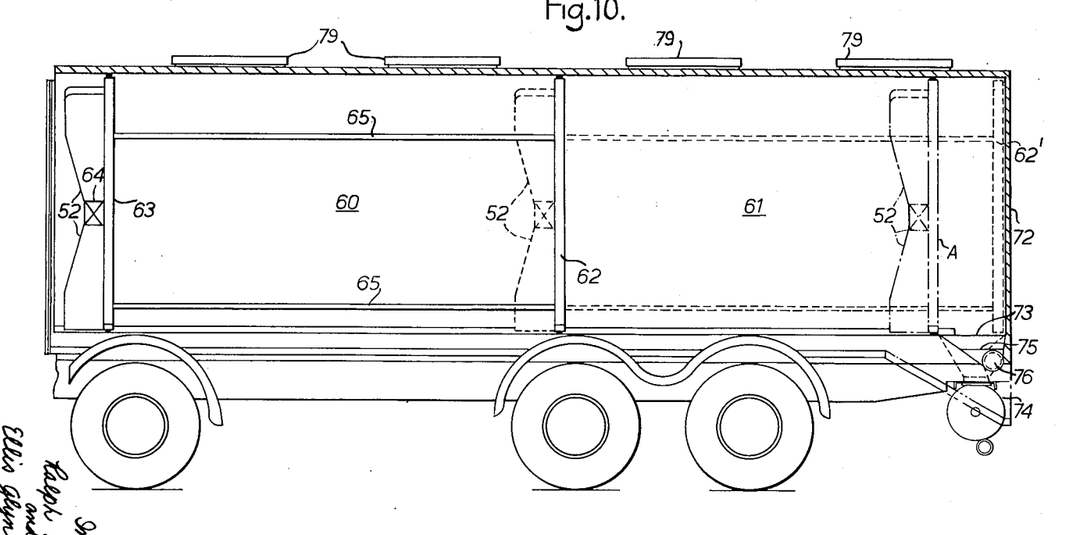
FIGURE 10 is an elevation partially in section of a bulk transporter vehicle having dual compartments provided with bulkheads.

Referring now to FIGURES 10 and 11 the body of the transporter is divided into two compartments 60, 61 by means of an additional or slave bulkhead 62, the main bulkhead being indicated at 63. Bulkhead 63 is traversed lengthwise of the body by means of hydraulic drive transmission, indicated generally at 64, through which motion is transmitted through racks or sprockets similiar to the arrangement described in the preceding embodiment.

Attached to the front side of the slave bulkhead 62 are guide rods 65 of which here are conveniently four, these guide rods in the normal or travelling position being supported at their forward ends in correspondingly positioned openings in the main bulkhead. Each opening has a sleeve member 66 having flanges 67, by which the sleeve members 66 are secured in the openings in the main bulkhead 63.

As can be seen from FIGURE 11 each of the sleeves 66 is provided with two diametrically opposite holes 68 adapted to register with a hole in the associated rod 65 and to receive a locking pin 70. In the arrangement shown, collars 71 are secured opposite each opening so as to provide a locating socket for the locking pins 70.

It will be seen that when the locking pins 70 are in position to lock the rods 65 to the main bulkhead the guide rods 65 also operate as connecting rods so that on rearward displacement of the main bulkhead 63 movement will be transmitted through the rods 65 to the second bulkhead 62 thereby causing it to move rearwardly through its compartment 61 to the dotted line position indicated at 62'.

It will be appreciated that by subdividing the body of the vehicle into two compartment 60, 61 it is possible to handle two different loads e.g. two types of grain or two grades of coal. When loading, which takes place through openings 79 in the top of the vehicle body, the powered bulkhead 63 and the slave bulkhead 62 are in their full line positions the quick release locking pins 70 having been inserted in the sockets 71 so as to lock the connector rods to the powered bulkhead.

When it is desired to unload, the unit 64 is brought into operation in order to traverse the powered bulkhead 63, thereby causing both it and its slave 62 to move to the rear. As this movement takes place the contents of the rear compartment 61 are discharged at the rear, either through a discharge opening, normally closed by a trapdoor, in the bottom of the floor and positioned at the rear as indicated at 73, or through doors, which may be of the hinge or sliding type (not shown) provided in the rear wall 72 of the body.

On complete discharge of compartment 61, at which time the slave bulkhead 62 has taken up position where it backs against the wall 72, it is then necessary to release the locking pins 70.

On release of pins 70 further movement of the powered bulkhead 63 is possible when the rods 65 will telescope through the sleeves 62 to discharge material from the chamber 60 through the opening 73.

In the embodiment illustrated discharge is by means of a rotary feeder and scavenge auger assembly indicated generally at 74. For this purpose a transversely arranged trough 75 is fitted beneath floor level at the rear end of the body in which is arranged an auger 76. Auger 76 delivers into a feeder casing. The locking pins may be remotely actuated from the driver's cabin or by access through a manhole in the body. For convenience each pin is operated through a pin and slot connection 77 to a lever arm 78 pivotally carried in brackets 78' on the bulkhead. Levers 78 may be extended so as to be accessible through an inspection opening for manual operation.

Figure 4:
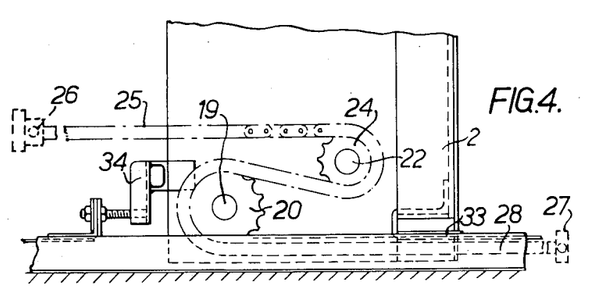
FIGURES 4 and 5 are respectively a part side elevation and sectional plan view of a chain and sprocket drive for traversing the bulkhead.
Figure 5:
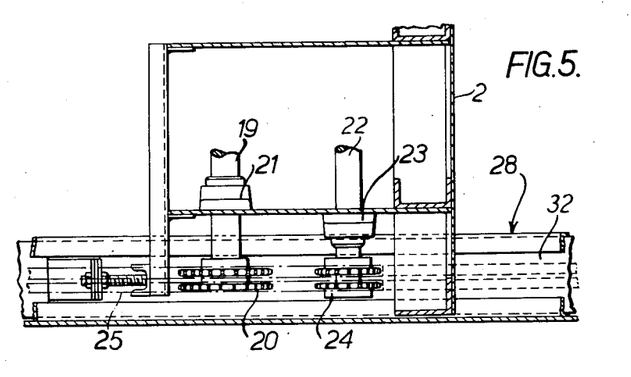

In an alternative arrangement shown in FIGURES 4 and 5 the racks and pinions are replaced by sprockets and chains, the general arrangement of which is the same as that of the racks and pinions shown in FIGURES 1–3. For convenience only one sprocket and chain are shown in FIGURES 4 and 5, it being understood that four such chains and sprockets are provided, one adjacent each corner of the bulkhead, and that the shafts on which the drive sprockets are mounted are driven by a hydraulic motor mounted on the bulkhead through the intermediary of reduction gearboxes and flexible couplings, as in the embodiment of FIGURES 1–3.

Referring to FIGURES 4 and 5, at each corner of the bulkhead 2 is a drive shaft 19 mounted in bearings 21. Shaft 19, which corresponds to, and is driven in an identical manner to, the shaft 15, has keyed to it a drive sprocket wheel 20. Associated with each sprocket 20 is an idler sprocket 24 on shaft 22 mounted in bearings 23 on the bulkhead.

An elongated chain element 25 anchored at one end to the front of the body of the vehicle, as indicated at 26, is passed round each sprocket 24 and then over sprocket 20 and anchored at 27 to the rear of the vehicle body.

The idler sprockets 24 are provided to ensure that at all times there is positive engagement between the chains 25 and driving sprockets 20 with no possibility of the sprockets 20 becoming disengaged from the chains.

It has been found desirable that the two chains adjacent the vehicle floor should be double duplex chains, whilst the upper chains may be single ones.

Figure 7:
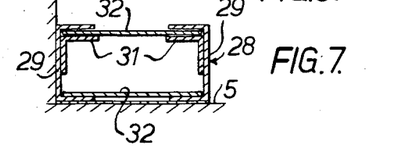

The part of chain 25 extending between the sprocket 20 and anchorage 27 lies in a channel 28, which is of open box section (see FIGURE 7), made up of two inwardly directed channel members 29 secured to the floor 5. A pair of inverted L-section members 31 form with the flanges of the channels 29 a locating channel in which is slidable a flexible steel cover strip 32 for covering the open side of the channel 28.

Figure 6:
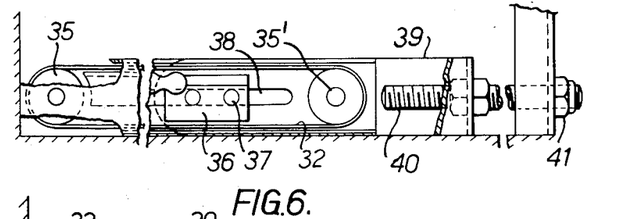
FIGURES 6 and 7 are respectively an elevation and transverse section showing the channel housing the chain drive together with anchorage for the chain drive and its method of adjustment.

This cover strip 32 moves with the bulkhead, to opposite sides of which it is secured, at the front at 33 and to a bracket 34, the return path being provided by rollers 35–35' (FIGURE 6).

Consequently upon movement of the bulkhead in either direction, the strip moves with the bulkhead so as to ensure that at all times the contnents of the vehicle body cannot enter the channel housing the chains 25.

In most cases it is sufficient to provide such channels and covers for the two chains at floor level but all four may be covered if desired.

In order to tension the chains, their rear anchorages 27 are adjustable as shown in FIGURE 6. Thus each anchorage comprises a block 36, which block is secured within its respective channel 28 by bolts 37 which, after passing through slots 38 in the channel members 29, engage the side limbs of a yoke 39. The yoke member is held to the rear of the body by a threaded bolt 40 having a nut 41, on turning which the block 36 is shifted, to adjust the tension of the chain 25.

Figure 12:
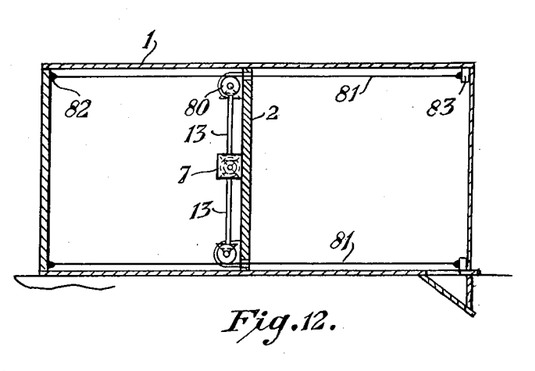
FIGURE 12 is a diagrammatic longitudinal vertical section through the body of a vehicle or other container showing a driving mechanism for the bulkhead comprising cables and pulleys.

Referring now to FIGURE 12, an alternative arrangement is shown for driving the bulkhead, in which cables and pulleys are employed in the place of racks and pinions or chains and sprockets. The general arrangement and manner of operation remains the same as described in connection with FIGURES 1 to 3, pulleys 80 being provided in place of the pinion wheels 16. These pulleys, which are four in number, one being provided at or adjacent each corner of the bulkhead, co-operate with cables 81 which are provided in place of racks 17. One end of each cable is fixed, as indicated at 82, to the front end of the vehicle or container body and the other end is fixed, as indicated at 83, to the rear end of the body, the cables being turned one or more times round the pulleys 80.

Covers for the cables 81 are provided as desired, the covers being of the same construction as described in connection with FIGURES 4 to 7, and the cables may be arranged to be tensioned in a similar manner to the chains 25.

Referring to FIGURES 8 to 9, two pairs of guide wheels indicated respectively at 42 and 43 are fitted to the bulkhead to ensure alignment and that it can move freely within the vehicle body. The lower pair of wheels engage the floor 5 while the upper pair 43 are mounted on vertical axes 54 for engagement with the side walls.

Each wheel is mounted on bracket arms 44 pivotally attached to the frame of the bulkhead at 45 in order to permit of adjustment.

Adjustment of each arm 44 is by means of a threaded pin and socket device, the pin component 47 of which is pivotally attached to the outer end of the arm while the socket 48 extends through an aperture in a bracket 49 on the bulkhead. The guide wheels 42, 43, not only serve partly to support the weight of the bulkhead but in addition they provide a means of centering it in relation to the interior vehicle body or other container, through which it is traversed.

Angled spring metal strips 50 fast with the operative face of the bulkhead and to which are attached sealing strips 51, prevent the material of the load making its way from one side of the bulkhead to the other.

As indicated in FIGURE 10, the frame of the bulkhead may not be completely rigid but may be cut away as at 52. When this is done and only one skin is provided on the operative face of the bulkhead, upon the bulkhead being traversed rearwardly there is a tendency for the bulkhead to assume a bowed formation with the center leading, consequently the angularity of the supporting strip 50 for the sealing strip 51, is increased resulting in closer sealing engagement with the inner surface of the vehicle body or other container and the sealing strip 51.

As shown in FIGURE 9, hooks, indicated at 53, or similar means may be provided on the operative or discharge side of the bulkhead to assist in loading a vehicle body or other container when instead of material in bulk, e.g. grain, packaged materials or goods are to be handled. The load is arranged on pallets or the like which are then coupled to the hooks so that on appropriate movement of the bulkhead, the load can be drawn into the body or container.

Satisfactory results have been obtained when the bulkhead is traversed approximately 2 ft. per minute but clearly the speed of travel of the bulkhead can be varied to suit requirements.

The number of drive racks 17 or chains 25 as well as their locations can be varied. Thus, in the case where the body is cylindrical, three drive racks or chains may be sufficient. However, in any case, the driving wheels are mounted on the bulkhead within the container body in spaced relationship to one another around the periphery of the bulkhead; and the cooperating elongated elements, be they racks, chains or cables are mounted within and are connected to the body. The precise location of the hydraulic motor on the bulkhead and the primary and secondary reduction gearboxes could be modified. Thus it may, for example, be found to be unnecessary to have two sets of reduction gearboxes, and the shafts 15 or 19 to which the pinions 16 and sprocket 20 are keyed, instead of being arranged horizontally, may extend vertically.

While the invention has been particularly described in conjunction with a road vehicle, it is to be understood that it is equally applicable to other forms of vehicle including railway wagons and aircraft or ships. Also as mentioned at the outset the invention can be applied to any form of container whether static or not.

It will be appreciated that one of the advantages of the present invention is that as applied to road vehicles, it is possible to provide a given size of vehicle chassis with a body of greater length than would be possible if the body were arranged for tipping, as has previously been the case in many bulk transporting vehicles, discharge for a body having a movable bulkhead being just as readily achieved as with a tipping body. Further, having a non tipping body eliminates height restriction at the loading and unloading points.

While in general it will normally be found to be most convenient to arrange the discharge opening at the rear of the body, this is not essential, and it may equally be provided at the centre, sides or front of the vehicle. Also if desired more than one discharge opening could be provided.

With regard to the manner in which the bulkhead is arranged to be driven although other forms of motor or prime mover could be employed the use of an hydraulic motor has great advantages. Thus such a motor provides what the inventor has called a "soft" drive. That is to say with an hydraulic motor the power can be gradually built up until the resistance to movement of the bulkhead is overcome, or in the event of the bulkhead being jammed, the pressure relief valve in the supply line to the motor blows. Thus the drive mechanism is not subjected to sudden shocks or forces, which are likely to occur with other forms of drive means, and which are liable to cause damage to the mechanism.

Conceivably the hydraulic motor could be replaced by, for example, an electric motor arranged to drive the driving wheels through a torque converter. Although this would avoid subjecting the drive mechanism to sudden shocks, it would however involve a more complex and costly arrangement than an hydraulic motor. A slipping clutch if employed would also avoid sudden shocks, but would not be satisfactory as in the event of considerable resistance to movement on behalf of the bulkhead it would continue to slip.

What we claims is:

1. A container for the storage or transport of material comprising a body having a substantially horizontal floor; a bulkhead extending across the interior of said body and mounted in said body for movement therein along said floor in opposite directions; a plurality of driving wheels mounted for rotation on said bulkhead in spaced relationship to one another around the periphery of said bulkhead; a plurality of elongated elements mounted within and being connected to said body to extend in the direction of movement of said bulkhead along said floor and having driving connection with said driving wheels respectively; and operating means mounted on said bulkhead and being drivingly connected to said driving wheels for operating the latter, thereby to move said bulkhead within said body to expel contents therefrom.

2. A container according to claim 1 in which said elongated elements comprise racks extending parallel to said floor, and said driving wheels comprise pinions meshing with said racks.

3. A container according to claim 1 in which said elongated elements comprise chains which extend parallel to said floor and are secured to said body, and in which said driving wheels comprise driving sprockets engaging said chains.

4. A container according to claim 3 including, adjacent each driving sprocket, an idler sprocket around which the associated chain is passed to ensure proper engagement between the chain and the driving sprocket.

5. A container according to claim 1 in which said elongated elements comprise cables which extend parallel to said floor and are secured to said body, and in which said driving wheels comprise pulleys engaging said cables.

6. A container according to claim 1 in which said operating means comprises an hydraulic motor.

7. A container according to claim 6 including drive shaft means mounting said driving wheels on said bulkhead, and reduction gear means for transmitting drive from said hydraulic motor to said drive shaft means.

8. A container according to claim 1 comprising a cover covering said elongated elements.

9. A container according to claim 8 in which said cover comprises a channel mounted in said body and having an open side; a cover strip in the general form of an endless belt having one stretch thereof extending over said channel open side; and rollers mounted at opposite ends of said channel and around which said cover strip is trained, said cover strip being connected to said bulkhead so as to move therewith.

10. A container according to claim 1 including guide means adjustably mounted on said bulkhead and engaging inner surfaces of said body for maintaining said bulkhead in proper alignment in said body.

11. A container according to claim 10 in which said guide means comprises a pair of wheels, one mounted on each side of said bulkhead; and another pair of wheels mounted on the bottom of said bulkhead.

12. A container according to claim 1 including sealing strips at the periphery of said bulkhead engaging inner surfaces of said body.

13. A container according to claim 12 in which said sealing strips include a spring metal strip secured to said bulkhead.

14. A container according to claim 13 in which said bulkhead is so constructed that when moved to expel the contents of said body, the center of the bulkhead bows forwardly in the direction of travel, and in which said sealing strips are secured to the face of said bulkhead which presses on said contents during expelling, whereby such bowing of said bulkhead causes said sealing strips to more closely engage the inner surface of said body.

15. A container according to claim 1 in which said body and said bulkhead are rectangular in cross section, and in which said driving wheels are located respectively at each corner of said bulkhead.

16. A container according to claim 1 including a secondary bulkhead extending across the interior of said body, mounted in said body for movement therein along said floor and being spaced from the first bulkhead to divide said body into two compartments; and means for moving said secondary bulkhead conjointly with movement of said first bulkhead.

17. A container according to claim 16 in which said means for moving said secondary bulkhead conjointly with movement of said first bulkhead comprises horizontal rod means fast with one of said bulkheads and extending slidably through the other of said bulkheads; and means for selectively securing said rod means to said other of said bulkheads to prevent sliding of said rod means through said other of said bulkheads.

18. In a vehicle for transporting materials in bulk, a container body having a floor; a bulkhead extending across the interior of said body and mounted therein for movement along said floor; a plurality of driving wheels mounted for rotation on said bulkhead in spaced relationship to one another around the periphery of said bulkhead; a plurality of elongated elements mounted within and being connected to said body, extending in the direction of movement of said bulkhead along said floor and having driving connection with said driving wheels respectively; and hydraulically actuated operating means mounted on said bulkhead and being drivingly connected to said driving wheels for operating the latter, thereby to move said bulkhead within said body to expel material therefrom.

19. A bulkhead assembly for use in a discharging container of the kind in which a bulkhead is mounted within the container for movement therein along the container floor for pushing material out of the container, said bulkhead assembly comprising a bulkhead wall; a plurality of driving wheels mounted for rotation on said bulkhead wall in spaced relationship to one another around the periphery of said bulkhead; and hydraulically actuated operating means mounted on said bulkhead wall and being drivingly connected to said driving wheels.

References Cited by the Examiner

UNITED STATES PATENTS

| | | | |
|---|---|---|---|
| Re. 24,959 | 3/61 | Trubinski | 214—518 |
| 2,047,602 | 7/36 | Tomlinson | 214—82 |
| 2,241,142 | 5/41 | Kvalheim | 212—27 X |
| 2,480,527 | 8/49 | Wachter | 214—82 |
| 2,495,096 | 1/50 | Grimaldi | 198—224 |
| 2,508,877 | 5/50 | Walker et al. | 214—518 |
| 2,643,014 | 6/53 | Calcagno | 214—519 |
| 2,693,890 | 11/54 | Bridge | 214—82 |
| 2,726,776 | 12/55 | Myers | 214—518 |
| 2,820,560 | 1/58 | Davis | 214—517 |
| 2,822,094 | 2/58 | Greer | 212—127 |

GERALD M. FORLENZA, *Primary Examiner.*

HUGO O. SCHULZ, *Examiner.*